W. McGRATH & E. J. BUCKBEE.
PIPE COUPLING.
APPLICATION FILED SEPT. 10, 1908.
930,984.
Patented Aug. 10, 1909.
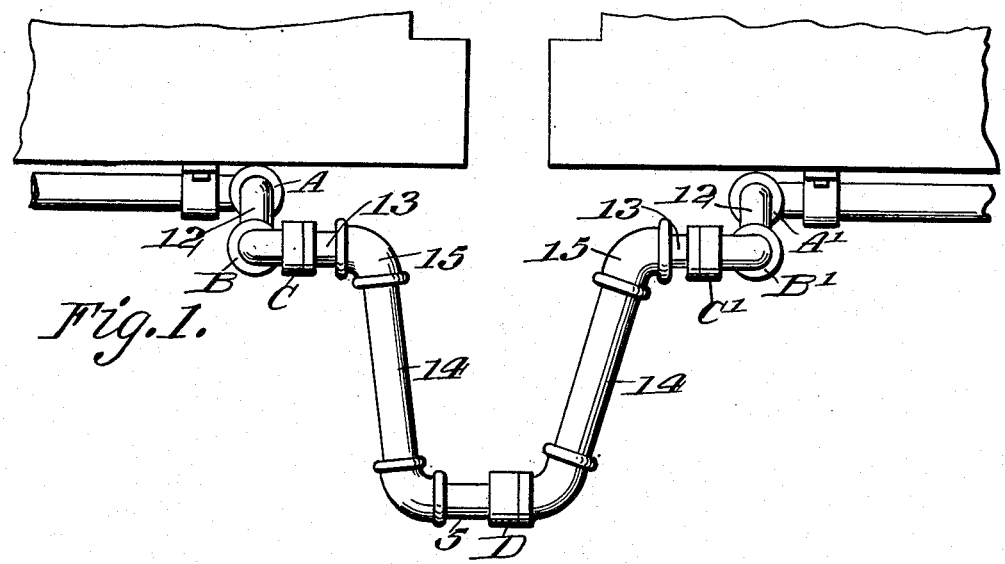
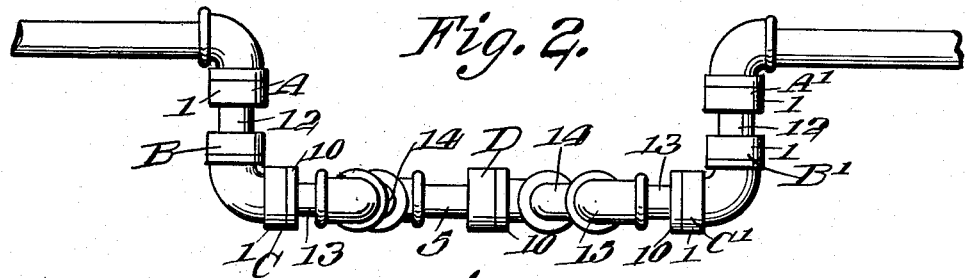
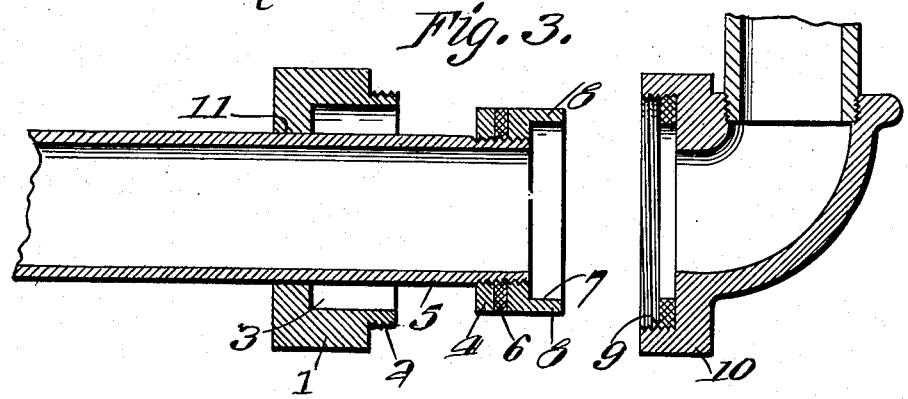
Witnesses
E. D. B. Brown.
C. H. Griesbauer.
Inventors:
Wm. McGrath and
E. J. Buckbee,
By H. B. Willson & Co
Attorneys

UNITED STATES PATENT OFFICE.

WILLIAM McGRATH AND EDWARD JOHN BUCKBEE, OF URBANA, ILLINOIS.

PIPE-COUPLING.

No. 930,984.　　　　　　Specification of Letters Patent.　　　　Patented Aug. 10, 1909.

Application filed September 10, 1908. Serial No. 452,487.

*To all whom it may concern:*

Be it known that we, WILLIAM MCGRATH and EDWARD JOHN BUCKBEE, citizens of the United States, residing at Urbana, in the county of Champaign and State of Illinois, have invented certain new and useful Improvements in Pipe-Couplings; and we do declare the following to be a full, clear, and exact description of the invention, such as will enable others skilled in the art to which it appertains to make and use the same.

Our invention relates to coupling devices for steam cars and the like, and particularly to the couplings used in connection therewith.

The object of the invention is to provide a coupling which may be readily and conveniently connected, and which will form a perfectly air-tight joint between two pipe sections, and at the same time permit rotary movement of either section with respect to the other.

A further object of the invention is to utilize a coupling of this type to connect the air systems of two different cars which have relative movement.

With these and other objects in view, the invention consists of certain novel features of construction, combination and arrangement of parts, as will be more fully described and particularly pointed out in the appended claim.

In the accompanying drawings, Figure 1 is a detail side elevation of the coupling used to connect two cars, Fig. 2 is a top plan view thereof, and Fig. 3 is a longitudinal sectional view of one of the couplings.

Referring more especially to the drawings each coupling comprises a socket member 1, which is provided with a threaded neck extension 2, and a socket or seat 3, in which the head 4 of the pipe section 5, is seated. This head 4 is screwed on the end of a pipe and is preferably provided with a packing ring 6. It is recessed at 7 to form an annular flange 8, adapted to enter a packing channel 9, formed in the coupling member 10, which preferably is formed in the shape of an elbow. In assembling each coupling the head 4 of the pipe section 5 is seated in the socket 3, and the pipe section 5 projected through an aperture 11 formed in the coupling member 1. The flange 8 is engaged in the packing channel 9 and the threaded collar 2 engages similar threads within the socket 9, so as to clamp the members 1 and 10, together with the pipe section 5, and its head located intermediate the two and thereby making a perfectly air-tight coupling.

In applying this coupling to connect different cars of a train seven couplings are employed to accomplish the connection although only one of the number may be unjointed when the cars are disconnected. Two of the seven couplings are secured to the car and are designated as couplings A and A', having secured to them the connecting pipe links 12, at the lower end of which are located the couplings B and B', which in turn have secured to their elbow ends the couplings C and C'. These couplings C and C' are connected to pipe links 13, which communicate with pipe links 14 by elbows 15. The lower ends of the links 14 are connected to the central coupling D, which is arranged transversely of the car so as to permit forward swinging, as will be readily understood. The links 12 which are flexibly connected to the couplings A and A', with their coöperating couplings B and B' permit the swinging of the sections when the cars come together. Any lateral motion of the cars is taken up by the coupling C. It will be readily seen that an efficient and flexible connection between two cars is provided, and this without resorting to the use of flexible tubes, which cannot possibly stand the strain exerted upon them and have any length of life.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described our invention, what we claim and desire to secure by Letters Patent is:—

In a device of the class described, the combination with a pair of pipes, elbows on their ends, flexible coupling on their ends arranged at horizontal right angles to the pipes, depending connecting pipe links secured to said couplings, flexible elbow couplings secured to the pipe links and extending horizontally and longitudinally parallel with the pipes, depending pipe sections connected to said elbow couplings, and a longitudinal flexible coupling for said depending pipe sections.

In testimony whereof we have hereunto set our hands in presence of two subscribing witnesses.

WILLIAM McGRATH.
EDWARD JOHN BUCKBEE.

Witnesses:
 CHAS. M. WEBBER,
 FRED HESS.